(12) United States Patent
Sinclair et al.

(10) Patent No.: US 11,698,526 B2
(45) Date of Patent: Jul. 11, 2023

(54) MULTI-CHANNEL OPTICAL SYSTEM

(71) Applicant: The Charles Stark Draper Laboratory, Inc., Cambridge, MA (US)

(72) Inventors: Matthew A. Sinclair, Stoneham, MA (US); Adam F. Kelsey, Cambridge, MA (US); David A. Landis, Palm Harbor, FL (US); Stephanie L. Golmon, Arlington, MA (US); Buddy Clemmer, Burlington, MA (US); Juha-Pekka Laine, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 173 days.

(21) Appl. No.: 16/785,022

(22) Filed: Feb. 7, 2020

(65) Prior Publication Data
US 2020/0257111 A1    Aug. 13, 2020

Related U.S. Application Data

(60) Provisional application No. 62/803,025, filed on Feb. 8, 2019.

(51) Int. Cl.
| | |
|---|---|
| *G02B 27/10* | (2006.01) |
| *G02B 27/00* | (2006.01) |
| *G02B 27/14* | (2006.01) |
| *G02B 17/06* | (2006.01) |

(52) U.S. Cl.
CPC ..... *G02B 27/0037* (2013.01); *G02B 17/0652* (2013.01); *G02B 27/1006* (2013.01); *G02B 27/149* (2013.01)

(58) Field of Classification Search
CPC ............ G02B 27/10; G02B 27/1006; G02B 27/1013; G02B 27/14; G02B 27/141; G02B 27/143; G02B 27/145; G02B 27/146; G02B 5/208
See application file for complete search history.

(56) References Cited

U.S. PATENT DOCUMENTS

| | | | | |
|---|---|---|---|---|
| 4,689,780 | A * | 8/1987 | Ohara | G11B 7/12 369/111 |
| 4,896,952 | A * | 1/1990 | Rosenbluth | G02B 17/08 359/638 |
| 4,948,229 | A * | 8/1990 | Soref | G02F 1/1326 349/196 |
| 4,981,352 | A * | 1/1991 | Tejima | G02B 27/149 349/8 |
| 5,134,468 | A * | 7/1992 | Ohmuro | H04N 9/097 359/665 |

(Continued)

FOREIGN PATENT DOCUMENTS

| | | | |
|---|---|---|---|
| CN | 102323670 A | * | 1/2012 |
| CN | 104125382 A | * | 10/2014 |

(Continued)

*Primary Examiner* — Christopher Stanford
(74) *Attorney, Agent, or Firm* — HoustonHogle LLP (57) ABSTRACT

A multi channel beamsplitter system operating over a wide spectral band has high optical performance despite the fact that the incoming and/or exiting light is not collimated and its material is dispersive. This is achieved using wavefront compensators that are matched to the curvature of the wavefronts of the incoming and/or exiting light.

20 Claims, 5 Drawing Sheets

(56) References Cited

U.S. PATENT DOCUMENTS

| | | | | |
|---|---|---|---|---|
| 5,719,702 A * | 2/1998 | Decker | ................ | G02B 27/283 359/638 |
| 5,748,365 A * | 5/1998 | Chen | ...................... | G02B 13/22 359/366 |
| 5,973,835 A * | 10/1999 | Tsou | .................... | G02B 27/283 359/489.09 |
| 6,215,597 B1 * | 4/2001 | Duncan | ................ | G02B 27/145 359/637 |
| 6,471,356 B1 * | 10/2002 | Gohman | ............ | G02B 26/0833 348/E5.142 |
| 8,326,142 B2 * | 12/2012 | Kravitz | ................... | H04N 5/33 396/333 |
| 9,069,265 B2 * | 6/2015 | de Boer | .............. | G01B 9/02007 |
| 9,383,550 B2 * | 7/2016 | Osborne | ............. | H04N 5/2253 |
| 10,001,603 B2 * | 6/2018 | Martinelli | .......... | G02B 6/29349 |
| 10,215,833 B1 * | 2/2019 | Hutchin | ................ | G01J 9/0215 |
| 10,732,378 B2 * | 8/2020 | Cannon | .................. | G02B 7/198 |
| 10,820,790 B2 * | 11/2020 | Nagae | .................. | G02B 21/365 |
| 11,022,793 B2 * | 6/2021 | Schowengerdt | ..... | G02B 26/103 |
| 2003/0185549 A1 * | 10/2003 | Partynski | ........... | G02B 17/0896 396/7 |
| 2007/0153115 A1 * | 7/2007 | Ueda | ........................ | G02B 5/04 348/335 |
| 2007/0286231 A1 * | 12/2007 | Kubo | ..................... | H04B 10/40 370/464 |
| 2010/0020307 A1 * | 1/2010 | Kunick | .............. | G02B 17/0663 356/5.01 |
| 2010/0079587 A1 * | 4/2010 | Yoshida | ............... | A61B 5/0071 348/68 |
| 2010/0108885 A1 * | 5/2010 | Samuelson | ............ | G02B 13/06 250/234 |
| 2014/0110585 A1 * | 4/2014 | Justice | ................... | H04N 5/332 250/349 |
| 2014/0139926 A1 * | 5/2014 | Cook | ................. | G02B 27/1013 359/629 |
| 2015/0350569 A1 * | 12/2015 | Espersen | .............. | H04N 5/2251 348/164 |
| 2018/0210166 A1 * | 7/2018 | Cannon | .................. | G02B 23/16 |
| 2018/0348059 A1 * | 12/2018 | Wang | ...................... | G01J 5/047 |
| 2021/0278684 A1 * | 9/2021 | Garan | ................. | G02B 27/283 |

FOREIGN PATENT DOCUMENTS

| | | | | | |
|---|---|---|---|---|---|
| CN | 107861242 A | * | 3/2018 | ......... | G02B 13/0045 |
| CN | 207676034 U | * | 7/2018 | ......... | G02B 13/0045 |
| CN | 106646898 B | * | 1/2019 | ......... | G02B 27/126 |
| DE | 19743526 A1 | | 3/1999 | ......... | G02B 27/1013 |
| JP | 2003338074 A | * | 11/2003 | | |
| JP | 2004177450 A | * | 6/2004 | | |
| JP | 2005184243 A | * | 7/2005 | | |
| JP | 2006157854 A | * | 6/2006 | ......... | G02B 13/0025 |
| JP | 2008113257 A | * | 5/2008 | | |
| JP | 2009086165 A | * | 4/2009 | ......... | G02B 27/1013 |
| JP | 4336409 B2 | * | 9/2009 | ......... | G02B 27/1013 |
| JP | 2010160312 A | * | 7/2010 | | |
| WO | WO-2008117023 A2 | * | 10/2008 | ............. | G02B 13/06 |
| WO | WO-2016056157 A1 | * | 4/2016 | ......... | G02B 27/1013 |
| WO | WO-2018216386 A1 | * | 11/2018 | ............... | G02B 5/04 |

* cited by examiner

MULTI-CHANNEL OPTICAL SYSTEM

RELATED APPLICATIONS

This application claims the benefit under 35 USC 119(e) of U.S. Provisional Application No. 62/803,025, filed on Feb. 8, 2019, which is incorporated herein by reference in its entirety.

BACKGROUND OF THE INVENTION

Digital camera systems will operate in the wavelengths in which their image sensors can detect light. Common consumer camera systems detect light in the visible wavelength band and their sensitivity may extend into the near infrared (IR) band. In such systems, standard glass refractive lenses are often used. That said, other image sensors work in longer wavelength bands. For example, InGaAs image sensors cover the short wave IR (SWIR) band, HgCdTe (MCT) image sensors cover the medium wave IR (MWIR) band, and Vanadium Oxide (VOx) image sensors operate into the long wave IR (LWIR) band. And, different lens materials will typically be used in these other bands.

There are a number of established and emerging areas of technology that require multiband imaging. This refers to the ability to simultaneously image a scene within different wavelength bands. This is useful because sometimes objects are better viewed in one band than another. Visible is preferred in the daytime, but a light source is required at night. On the other hand, warm objects can be seen in the thermal bands at night without any other light source. Further, different meteorological effects, e.g., fog, affect the bands differently. Especially machine vision often benefits from processing images in different bands simultaneously to ensure accurate operation over a wide variety of conditions.

It is usually preferred that the multi band camera collect the different images through the same aperture, along a common boresight. This allows images from the different bands to be registered and directly compared to each other. The resulting image data can even be represented as a hyperspectral cube, which is intensity as a function of the two-dimensional pixel coordinates and the spectral bands define the third dimension.

Some multiband cameras will employ a combination of a reflective front end light collection system, followed by a beamsplitter system, followed by separate image sensor optical trains associated for each of the bands. The broadband mirror coatings for the front light collection system are easy to manufacture. The mirrors can be lightweight, enabling larger entrance apertures. Different dichroic coatings can then be used in the beamsplitter system to peel-off each of the bands. On the other hand, a number of different image sensor technologies and refractive lens materials can be employed in each of the different image sensor optical trains.

As a general matter, the resolution of an optical imaging system is limited by factors such as imperfections in the lenses or misalignment. Nevertheless, there is a principal limit to the resolution of any optical system, due to the physics of diffraction. A diffraction limited optical system is one that operates at its theoretical limit. It is generally desirable to design optical systems so that it can perform at this limit.

Another concern that is especially important in multiband imaging systems when a material, such as a lens, is located in the beam path, is the Abbe number of that material. Also known as the V-number or constringence of a transparent material, the Abbe number is a measure of the material's refractive index variation versus wavelength and thus the chromatic dispersion that will be introduced by a lens, for example, that is made from that material. High values of V indicate low dispersion, whereas low values indicate high dispersion.

SUMMARY OF THE INVENTION

Especially if the goal is high performance, care must be taken in the design of the beamsplitter system of a multiband imaging system.

One common tool for splitting off one band from another is a plane parallel plate (PPP) placed at 45 degrees to the incident beam. The plate can be a pellicle mirror or coated with a dichroic coating that is transmissive to one band but reflective to the other. The use of the PPP will add significant non-symmetric aberrations. These aberrations can be corrected by collimating the beam through the PPP or adding a second orthogonal PPP later in the optical train. Both of these solutions, however, complicate the optical design and also tend to lengthen the system.

A different tool, that avoids the problems associated with the PPP, is a cube beamsplitter. These devices are fabricated from a cube of material that sandwiches a diagonal dichroic filter. The cube beamsplitter, however, will add spherical aberration, which could be removed with an aspheric lens or surface, but such components add to the design. Moreover, especially in a multiband system, the beam cube material is a challenge because of the required wide spectral band.

The present invention concerns a multi-channel beamsplitter system, thus operating over a wide spectral band. It can have high optical performance despite the fact that the incoming light is not collimated and its material is dispersive. This is achieved using wavefront compensators that are matched to the curvature of the wavefronts of the incoming and/or exiting light.

In general, according to one aspect, the invention features a multichannel beamsplitter optical system, comprising one or more beamsplitters and one or more integrated wavefront compensators having curved surfaces to match a wavefront of light received by or transmitted from the optical system.

In embodiments, the one or more beamsplitters are cube beamsplitters. More specifically, a first beamsplitter separates visible and shortwave infrared from mid wave infrared and long wave infrared, a second beamsplitter separates the mid wave infrared from the long wave infrared, and a third beamsplitter separates the visible from the shortwave infrared.

It should be noted that a two or three channel system can optionally be constructed using fewer beamsplitters. For example, a shortwave infrared channel is not always required. Thus, a third beamsplitter is not used in some examples.

The light received by the beamsplitter optical system is collected from a scene by a light collection system, which is preferably an all-reflecting system. It might comprise at least a primary mirror directing light to a secondary mirror. One embodiment further includes a tertiary mirror and a quaternary mirror.

In the current embodiment, the beamsplitters are constructed from zinc sulfide, which is transmissive over a wide spectral band.

In general, according to one aspect, the invention features a multichannel camera system comprising a light collection system for collecting light from a scene and a beamsplitter optical system including one or more beamsplitters and an input integrated wavefront compensator having curved surface to match a wavefront of light received from the light collection system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. The patent or application file contains at least one drawing executed in color. Copies of this patent or patent application publication with color drawings(s) will be provided by the Office upon request and payment of the necessary fee. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
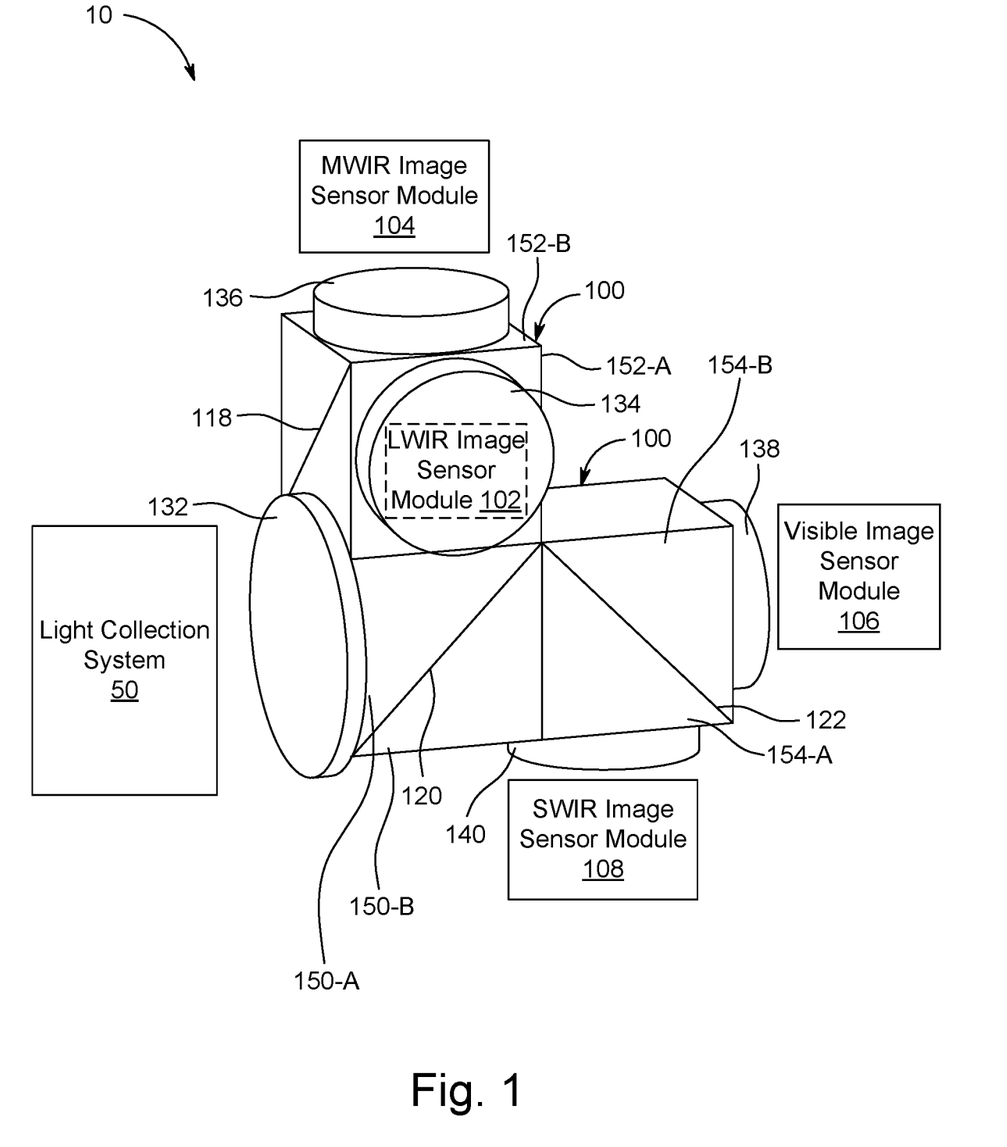
FIG. 1 is a perspective view of a multi, e.g., four, channel beamsplitter system according to the present invention.

FIG. 1 shows a multi-, e.g., 4, channel beamsplitter system 100 for digital camera system 10, which has been constructed according to the principles of the present invention.

In more detail, light from a target is collected by a light collection system 50 of the camera system 10. Often, this light collection system 50 will be an all-reflecting system comprising a series of mirrors. Such all-reflecting systems generally are preferred when operating over wide spectral domains. Highly reflecting, wide-band coatings are generally easily fabricated.

A characteristic of the typical application is that the system should be as compact as possible. As a result, the light that is transferred from the light collection system 50 to the beamsplitter system 100 is not collimated. Specifically, in the typical case, it is converging. That said, there are other situations where the light from the light collection system 50 is diverging when entering the 4 channel beamsplitter system 100.

In any event, the light is often converging at greater than one degree from the center optical axis. In fact, in many instances, it is converging at 2 degrees or more.

On the other hand, there are a limited number of materials from which the beamsplitter system 100 can be constructed. Few materials are transmissive in the visible (VIS) extending from about 380 to 740 nanometers, short-wavelength infrared (SWIR) extending from 1.4 to 3 µm, mid wave infrared (MWIR) extending from 3-8 µm, and long wave infrared (LWIR) extending from 8 to 15 µm. (Note that for the purposes of the discussion the visible will also include the near infrared, extending from 0.75-1.4 µm, since it can be detected with the same silicon detectors used for the visible.) Zinc Selenide, sapphire, and magnesium fluoride, for example, do not transmit across the visible and LWIR. Barium, fluoride and potassium bromide are fragile. Sodium Chloride absorbs water.

One possible candidate is zinc sulfide, which is used in the current embodiment. This material is marked as Advanced Materials' CLEARTRAN™, which is a form of zinc sulfide that has been modified by a process that removes zinc hydrides from the crystal lattice, normalizes crystal structure and purifies the material, all contributing to single crystal-like transmittance in the visible through far infrared ranges (0.35-14 µm).

Unfortunately, the Abbe number of zinc sulfide is very low, less than 30, such as about 15.

Because the incoming light is not collimated and combined with the dispersion inherent in the constituent material, the beamsplitter system would typically add symmetrical aberrations. However, the beamsplitter system 100 employs a series of wavefront compensators to achieve high optical performance such as approaching diffraction limited imaging.

In more detail, the light enters an input integrated wavefront compensator 132 of the 4 channel beamsplitter system 100. The proximal or entrance surface of this compensator 132 is curved to match the wavefront of the light from light collection system 50. Note that in the preferred embodiment, the light collection system 50 is an all-reflecting system that collects light from a scene. Thus, there is no dispersion and all of the wavefronts for the different spectral bands have the same curvature.

After leaving the back, typically flat, surface of the input integrated wavefront compensator 132, the light enters a first VIS-SWIR/MWIR-LWIR splitter right angle prism 150-A. This is bonded to a second VIS-SWIR/MWIR-LWIR splitter right angle prism 150-B. A VIS-SWIR/MWIR-LWIR splitter coating 120 is provided at the interface of these two prisms 150-A, 150B, and is typically a coating deposited on one of the adjoining surfaces, to thereby form a VIS-SWIR/MWIR-LWIR cube beamsplitter.

In the illustrated embodiment, this divides the incoming light into two spectral bands VIS-SWIR and MWIR-LWIR.

The VIS-SWIR, in the illustrated embodiment, passes to a first VIS/SWIR splitter right angle prism 154-A. This is bonded to a second VIS/SWIR splitter right angle prism 154-B. VIS/SWIR splitter coating 122 is provided at the interface of these two prisms 154-A, 154B, and typically is a coating deposited on one of the adjoining surfaces, to thereby form the VIS/SWIR cube beamsplitter.

The VIS/SWIR splitter coating 122 divides the VIS from the SWIR. In the illustrated embodiment, the VIS is transmitted on through to an integrated visible exit wavefront compensator 138 to a VIS image sensor module 106. On the other hand, the SWIR is reflected downward through a SWIR integrated exit wavefront compensator 140 to a SWIR image sensor module 108.

Each of the visible integrated wavefront compensator 138 and the SWIR integrated wavefront compensator 140 have exit surfaces that are curved to match the wavefront of the light in the corresponding band, VIS and SWIR, respectively. Specifically, the exit surface of the visible integrated wavefront compensator 138 matches wavefront of the transmitted visible light. The exit surface of the SWIR integrated wavefront compensator 140 matches wavefront of the transmitted SWIR light.

The MWIR-LWIR light, in the illustrated embodiment, is reflected by VIS-SWIR/MWIR-LWIR splitter coating 120 and passes to a first MWIR/LWIR splitter right angle prism 152-A. This is bonded to a second MWIR/LWIR splitter right angle prism 152-B. A MWIR/LWIR splitter coating 118 is provided at the interface of these two prisms 152-A, 152-B, typically as a coating deposited on one of the adjoining surfaces, to thereby form a MWIR/LWIR cube beamsplitter.

The MWIR/LWIR splitter coating 118 divides the MWIR from the LWIR. In the illustrated embodiment, the MWIR is transmitted on through to an integrated MWIR exit wavefront compensator 136 to an MWIR image sensor module 104. On the other hand, the LWIR is reflected laterally through a LWIR integrated exit wavefront compensator 134 to an LWIR image sensor module 102.

Here also, each of the MWIR integrated wavefront compensator 136 and the LWIR integrated wavefront compensator 134 have exit surfaces that are curved to match the wavefront of the light in the corresponding band, MWIR and LWIR. Specifically, the exit surface of the MWIR integrated wavefront compensator 136 matches wavefront of the transmitted MWIR light. The exit surface of the LWIR integrated wavefront compensator 134 matches wavefront of the transmitted LWIR light.

Figure 2:
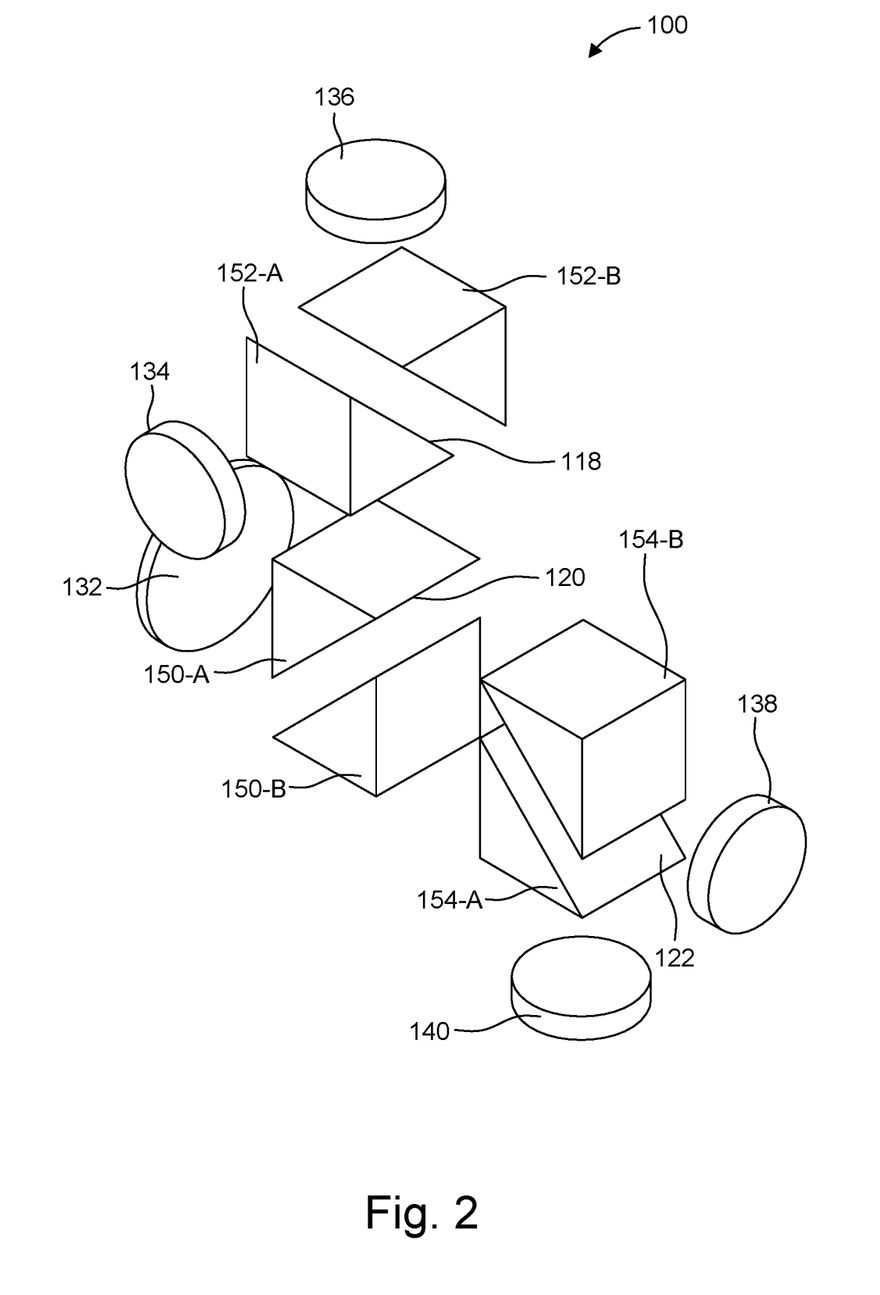
FIG. 2 is an exploded view of the four channel beamsplitter system of FIG. 1.

FIG. 2 shows the 4 channel beamsplitter system 100 exploded, prior to the bonding of the right angle prisms to each other to yield the VIS-SWIR/MWIR-LWIR cube beamsplitter, VIS/SWIR cube beamsplitter, and MWIR/LWIR cube beamsplitter. Then, the integrated wavefront compensators are bonded to the thus constructed cube beamsplitters.

Figure 3A:
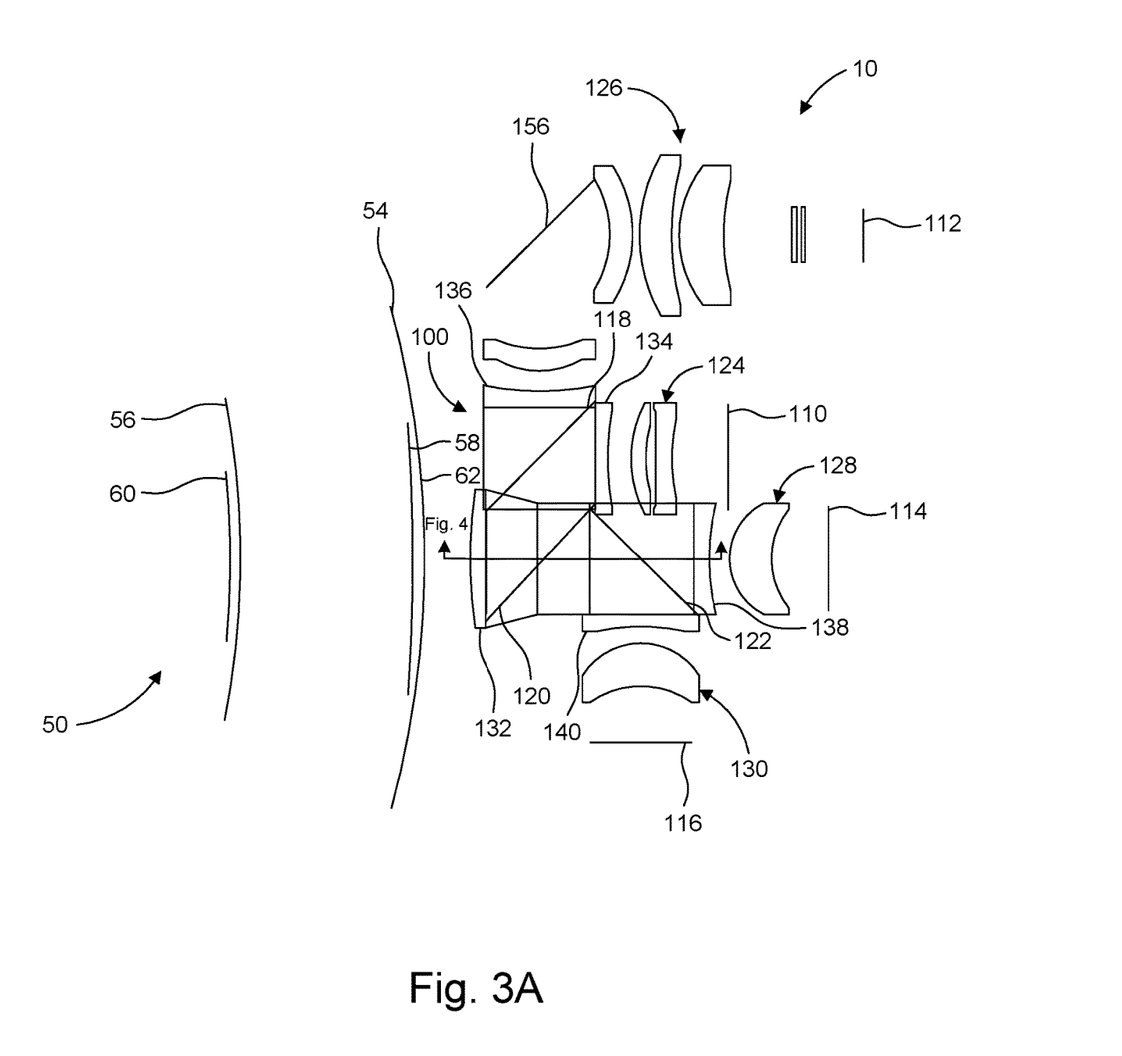
FIGS. 3A and 3B are side cross-sectional views of a four channel digital camera system employing a variant of the four channel beamsplitter system of FIG. 1, without and with ray traces, respectively.
Figure 3B:
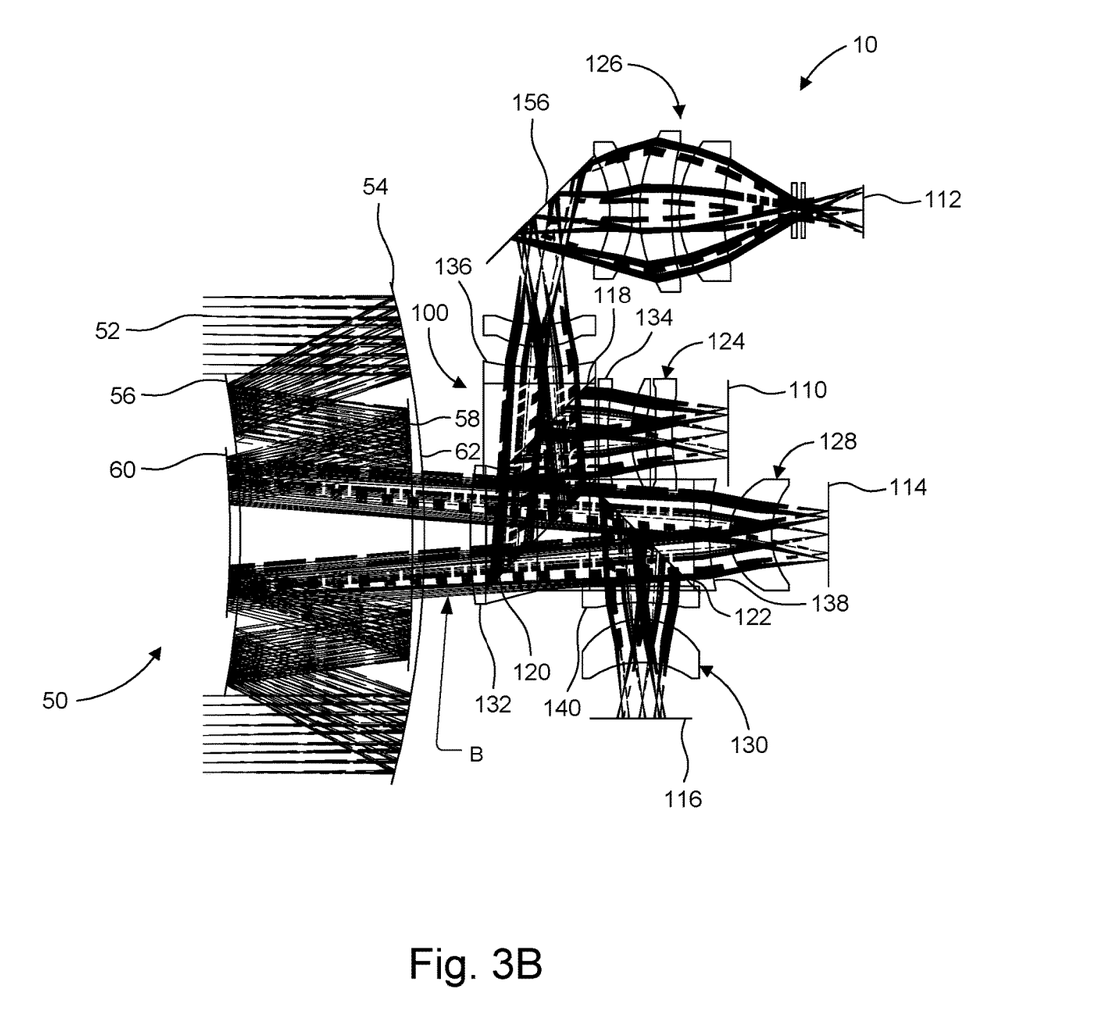

FIGS. 3A and 3B are side cross-sectional views of a four channel digital camera system 10 employing a variant of the four channel beamsplitter system of FIG. 1.

Here, the light collection system 50 is a reflective system comprising a primary mirror 54 that reflects light to a secondary mirror 56. The secondary mirror 56 reflects light to a tertiary mirror 58. Finally, the tertiary mirror reflects the light to a quaternary mirror 60 that then reflects light through a primary mirror aperture 62 to the beamsplitter system 100. In the typical system, both the primary mirror 54 and the tertiary mirror 58 are fabricated in a common, first mirror substrate, in which the primary mirror aperture 62 has been formed. Similarly, the secondary mirror 56 and the quaternary mirror 60 are formed in a second mirror substrate.

Clearly shown is how the input light into the beamsplitter system 100 is non collimated and specifically converging.

Also shown are the respective lens trains and image sensors. For example, the light exiting the VIS integrated wavefront compensator 138 is imaged by a visible lens train 128 onto a visible image sensor 114 of the visible image sensor module 106.

In one example, the visible image sensor 114 has at least 1600×1200 pixel focal plane array and is a CMOS image sensor.

The light exiting the SWIR integrated wavefront compensator 140 is imaged by a SWIR lens train 130 onto the SWIR image sensor 116 of the SWIR image sensor module 108.

In one example, the SWIR image sensor 116 has at least a 640×512 InGaAs image plane pixel array.

The light exiting the MWIR integrated wavefront compensator 136 is imaged by a MWIR lens train 126 onto the MWIR image sensor 112 of the MWIR image sensor module 104.

In one embodiment, MWIR image sensor 112 is a HgCdTe detector with an integrated dewar cooler assembly. One example has 1280×720, with a 12 µm pitch, focal plane pixel array.

A fold mirror 156 is added in the MWIR train for compactness. (Also note that in this variant the MWIR/LWIR cube beamsplitter 152 is rotated 90 degrees relative to the FIG. 1 version.)

The light exiting the LWIR integrated wavefront compensator 134 is imaged by a LWIR lens train 124 onto the LWIR image sensor 110 of the LWIR image sensor module 102.

In one example, the LWIR image sensor 110 is a 12 µm pitch vanadium oxide (VOx) uncooled detector, having at least a 640×512 or 320×256 focal plane pixel array.

Figure 4:
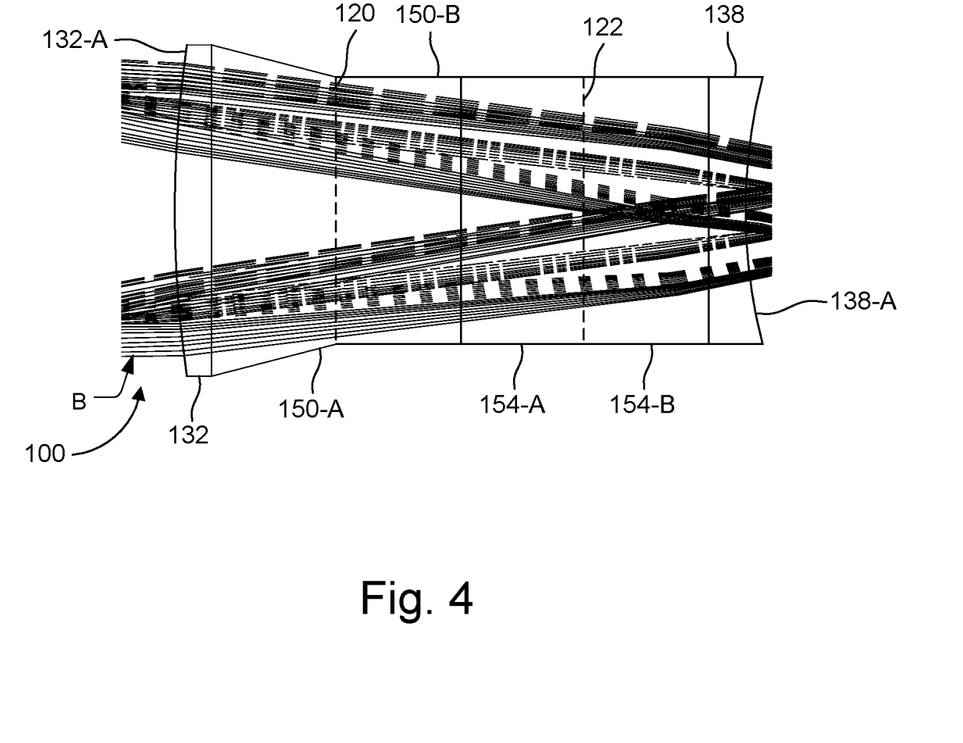
FIG. 4 is a cross-sectional view of the four channel beamsplitter system of FIG. 3 variant showing the path of the visible light.

FIG. 4 is a cross-sectional view of the four channel beamsplitter system 100 showing the path of the visible light.

It shows the input integrated wavefront compensator 132. The curvature of its leading surface 132-A matches the wavefront of the incoming light, including the visible. That is, the converging beam B from the light collection system 50 is orthogonal to the leading surface across at each point along the entire width of the beam B.

In the illustrated example, the first VIS-SWIR/MWIR-LWIR splitter right angle prism 150-A and second VIS-SWIR/MWIR-LWIR splitter right angle prism 150-B are each flared in the direction of the incoming light in order to accommodate the upstream width of the converging beam B.

The visible light passes through the VIS-SWIR/MWIR-LWIR splitter coating 120 to the first VIS/SWIR splitter right angle prism 154-A and the second VIS/SWIR splitter right angle prism 154-B. In the example, the light similarly passes through the VIS/SWIR splitter coating 122 and then exits the beamsplitter system 100 via the visible integrated wavefront compensator 138. The curvature of the trailing surface 138-A of the visible integrated wavefront compensator 138 is matched to the wavefront of the visible light exiting the beamsplitter system 100.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multichannel beamsplitter optical system, comprising:
   a light collection system for collecting light from a scene and producing a converging beam of light;
   a first cube beamsplitter;
   a second cube beamsplitter bonded to the first cube beamsplitter; and
   an input wavefront compensator bonded to the first cube beamsplitter and having a convex curved surface to match a wavefront of the converging beam of light received from the light collection system; and
   a first output wavefront compensator having a concave surface matching a wavefront converging beams of light exiting the second cube beamsplitter.

2. The system of claim 1, wherein the first cube beamsplitter separates visible and shortwave infrared from mid wave infrared and long wave infrared.

3. The system of claim 2, wherein the second cube beamsplitter separates the mid wave infrared from the long wave infrared.

4. The system of claim 3, further comprising a third beamsplitter bonded to the first beamsplitter that separates the visible from the shortwave infrared.

5. The system of claim 1, wherein the light collection system is an all-reflecting system consisting of a series of mirrors.

6. The system of claim 1, wherein the light collection system comprises at least a primary mirror directing light to a secondary mirror.

7. The system of claim 1, wherein the light collection system comprises a primary mirror, a secondary mirror receiving light from the primary mirror, a tertiary minor receiving light from the secondary mirror, and a quaternary mirror receiving light from the tertiary mirror and directing the light through an aperture in the primary mirror.

8. The system of claim 1, wherein a material of the cube beamsplitters has an Abbe number of less than 30.

9. The system of claim 1, wherein the beamsplitters are constructed from zinc sulfide.

10. A multichannel camera system, comprising:
    a light collection system for collecting light from a scene; and
    a beamsplitter optical system including three cube beamsplitters bonded to each other and an input integrated wavefront compensator, bonded to the one of the beamsplitters, the input integrated wavefront compensator having a curved surface to match a wavefront of light received from the light collection system and at least two exit integrated wavefront compensators, bonded to the two of the beamsplitters, the two exit integrated wavefront compensators having a curved surface to match a wavefront of converging light exiting the beamsplitter optical system.

11. The system of claim 10, wherein the three cube beamsplitters include
    a first beamsplitter that separates visible and shortwave infrared from mid wave infrared and long wave infrared;
    a second beamsplitter that separates the mid wave infrared from the long wave infrared, and
    a third beamsplitter that separates the visible from the shortwave infrared.

12. The system of claim 10, wherein the light collection system is an all-reflecting system consisted of a series of mirrors.

13. The system of claim 10, wherein the light collection system comprises at least a primary mirror directing light to a secondary mirror.

14. The system of claim 10, wherein the l h ollection system comprises:
    a primary mirror;
    a secondary mirror receiving light from the primary mirror;
    a tertiary mirror receiving light from the secondary mirror; and
    a quaternary mirror receiving light from the tertiary mirror and directing the light through an aperture in the primary mirror.

15. The system of claim 10, wherein a beam of light from light collection system is converging.

16. The system of claim 10, wherein beams of light exiting the multichannel beamsplitter optical system are converging.

17. A multichannel camera system, comprising:
    a light collection system for collecting light from a scene and producing a converging beam of light;
    a first sensor module for detecting light in a first spectral band, a second sensor module for detecting light in a second spectral band, and a third sensor module for detecting light in a third spectral band;
    a beamsplitter optical system including a first cube beamsplitter that separates light into different spectral bands, a second cube beamsplitter that separates light in the first spectral band from the second spectral band, and a third cube beamsplitter that separates light in the third spectral band, an input integrated wavefront compensator having an entrance surface that is curved to match a wavefront of the converging beam of light from the light collection system and is bonded to the first cube beamsplitter, an integrated first exit wavefront compensator attached to the second cube beam splitter and having an exit surface that is curved to match a wavefront of the light in the first spectral band exiting the second cube beamsplitter and prior to detection by the first sensor module; an integrated second exit wavefront compensator attached to the second cube beam splitter and having an exit surface that is curved to match a wavefront of the light in the second spectral band exiting the second cube beamsplitter and prior to detection by the second sensor module, and an integrated third exit wavefront compensator attached to the third beam splitter and having an exit surface that is curved to match a wavefront of the light in the third spectral band exiting the third cube beamsplitter and prior to detection by the third sensor module.

18. The system of claim 17, wherein the beamsplitters are cube beamsplitters a material of the cube beamsplitters has an Abbe number of less than 30.

19. The system of claim 17, wherein the beamsplitters are constructed from zinc sulfide.

20. The system of claim 17, further comprising an integrated fourth exit wavefront compensator attached to the third beam splitter and having an exit surface that is curved to match a wavefront of the light exiting the third cube beamsplitter and prior to detection by a fourth sensor module.

\* \* \* \* \*